United States Patent
Moon et al.

(10) Patent No.: US 11,182,071 B2
(45) Date of Patent: Nov. 23, 2021

(54) APPARATUS AND METHOD FOR PROVIDING FUNCTION ASSOCIATED WITH KEYBOARD LAYOUT

(71) Applicant: Samsung Electronics Co., Ltd., Gyeonggi-do (KR)

(72) Inventors: Min Jung Moon, Gyeonggi-do (KR); Min Jeong Moon, Gyeonggi-do (KR); Myo Jin Bang, Gyeonggi-do (KR); Seo Young Yoon, Gyeonggi-do (KR); Ha Young Jeon, Gyeonggi-do (KR); Jae Gi Han, Gyeonggi-do (KR); Ji Yoon Heo, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 40 days.

(21) Appl. No.: 16/199,381

(22) Filed: Nov. 26, 2018

(65) Prior Publication Data

US 2019/0265886 A1    Aug. 29, 2019

(30) Foreign Application Priority Data

Feb. 23, 2018 (KR) .................. 10-2018-0021874

(51) Int. Cl.
*G06F 3/0488* (2013.01)
*G06F 3/0485* (2013.01)
*G06F 3/0482* (2013.01)

(52) U.S. Cl.
CPC ........ *G06F 3/04886* (2013.01); *G06F 3/0482* (2013.01); *G06F 3/0485* (2013.01); *G06F 3/04883* (2013.01)

(58) Field of Classification Search
CPC ..................................................... G06Q 40/00
See application file for complete search history.

(56) References Cited

U.S. PATENT DOCUMENTS

| | | |
|---|---|---|
| 9,081,499 B2 | 7/2015 | Kondo et al. |
| 10,289,662 B2 | 5/2019 | Greisson et al. |
| 2011/0219302 A1 | 9/2011 | Kondo et al. |
| 2012/0019446 A1 | 1/2012 | Wu et al. |

(Continued)

FOREIGN PATENT DOCUMENTS

| | | | |
|---|---|---|---|
| KR | 10-2012-0016060 A | 2/2012 | |
| KR | 20150160172 | * 11/2015 | ........... G06F 3/0482 |

(Continued)

OTHER PUBLICATIONS

International Search Report dated Feb. 27, 2019.
European Search Report dated Jan. 22, 2021.

*Primary Examiner* — Cao H Nguyen
(74) *Attorney, Agent, or Firm* — Cha & Reiter, LLC

(57) ABSTRACT

An electronic device is provided. The electronic device includes a display, and at least one processor. The at least one processor is configured to execute the application, display a first screen, display a second screen in response to a user input for selecting an input field or a text input button included in the first screen, display a keyboard layout and a user interface (UI) including at least one input button associated with the keyboard layout within the second screen when a specified condition is met, and display the keyboard layout and an input button for calling the UI within the second screen when the specified condition is not met.

12 Claims, 20 Drawing Sheets

(56) References Cited

U.S. PATENT DOCUMENTS

| | | | |
|---|---|---|---|
| 2012/0113011 A1 | 5/2012 | Wu et al. | |
| 2015/0109207 A1* | 4/2015 | Li | H04M 1/23 |
| | | | 345/158 |
| 2015/0293696 A1 | 10/2015 | Kondo et al. | |
| 2015/0317293 A1 | 11/2015 | Greisson et al. | |
| 2016/0034178 A1 | 2/2016 | Yoon | |
| 2016/0283107 A1 | 9/2016 | Kondo et al. | |
| 2017/0060413 A1* | 3/2017 | Singh | G06F 3/0233 |
| 2017/0097765 A1 | 4/2017 | Chao | |
| 2017/0308290 A1* | 10/2017 | Patel | G06F 3/04817 |
| 2018/0004307 A1* | 1/2018 | Nagasaka | G06F 3/0233 |
| 2018/0081534 A1* | 3/2018 | Jeong | G06F 3/04883 |
| 2018/0183921 A1* | 6/2018 | Choi | H04M 1/72469 |

FOREIGN PATENT DOCUMENTS

| | | | |
|---|---|---|---|
| KR | 10-2016-0014329 A | | 2/2016 |
| KR | 10-2017-0056846 A | | 5/2017 |
| KR | 20170056846 | * | 5/2017 |
| WO | 2017/184213 A1 | | 10/2017 |

* cited by examiner

APPARATUS AND METHOD FOR PROVIDING FUNCTION ASSOCIATED WITH KEYBOARD LAYOUT

CROSS-REFERENCE TO RELATED APPLICATION(S)

This application is based on and claims priority under 35 U.S.C. § 119 to Korean Patent Application No. 10-2018-0021874, filed on Feb. 23, 2018, in the Korean Intellectual Property Office, the disclosure of which is incorporated by reference herein its entirety.

BACKGROUND

1. Field

The present disclosure relates to an apparatus and method for providing a function associated with a keyboard layout.

2. Description of Related Art

Each of electronic devices, such as smartphones and wearable devices, may display a keyboard layout or a number keypad capable of receiving a user input on its display. However, it is important to display the keyboard layout at relevant times.

The above information is presented as background information only to assist with an understanding of the present disclosure. No determination has been made, and no assertion is made, as to whether any of the above might be applicable as prior art with regard to the present disclosure.

SUMMARY

An electronic device may provide a function associated with a keyboard layout. The function associated with the keyboard layout may include, for example, an emoticon ("emotion icon", or a pictorial representation of a facial expression), an emoji (a small digital image or icon used to express an idea or emotion), a speech recognition trigger, settings of the keyboard layout, automatic word completion, or the like. The electronic device may display a user interface (UI), including at least one input button for calling the function associated with the keyboard layout, on its display.

The UI including the at least one input button may be displayed on at least a partial region of the display. When a user of the electronic device operates the keyboard layout or another UI (e.g., a toolbar associated with an application) displayed on the display, an error may occur due to the UI including the at least one input button displayed on the display.

Aspects of the present disclosure may address at least the above-mentioned problems and/or disadvantages and may provide at least the advantages described below. Accordingly, an aspect of the present disclosure may provide an electronic device for adaptively displaying at least one input button for calling a function associated with a keyboard layout based on a specified condition.

Accordingly, another aspect of the present disclosure may provide an electronic device for displaying at least one input button for calling a function associated with a keyboard layout in various forms.

In accordance with an aspect of the present disclosure, an electronic device is provided. The electronic device may include a display, and at least one processor. The at least one processor may be configured to execute the application, display a first screen, display a second screen in response to a user input for selecting an input field or a text input button included in the first screen, display a keyboard layout and a user interface (UI) including at least one input button associated with the keyboard layout within the second screen, when a specified condition is met, and display the keyboard layout and an input button for calling the UI within the second screen, when the specified condition is not met.

In accordance with another aspect of the present disclosure, a method of an electronic device is provided. The method may include displaying a first screen, and displaying a second screen in response to a user input for selecting an input field or a text input button included in the first screen. The displaying of the second screen may include displaying a keyboard layout and a UI including at least one input button associated with the keyboard layout within the second screen, when a specified condition is met and displaying the keyboard layout and an input button for calling the UI within the second screen, when the specified condition is not met.

In accordance with another aspect of the present disclosure, an electronic device is provided. The electronic device may include a display, and at least one processor. The at least one processor may be configured to display a first screen, display a second screen in response to a user input for selecting an input field or a text input button included in the first screen, display a keyboard layout and a UI including at least one input button associated with the keyboard layout within the second screen, when a specified condition is met, and display the keyboard layout and an input button for calling the UI within the second screen, when the specified condition is not met.

According to embodiments disclosed in the present disclosure, the electronic device may reduce an error operation of a user by adaptively displaying at least one input button for calling a function associated with a keyboard layout.

According to embodiments disclosed in the present disclosure, the electronic device may provide convenience to the user by displaying at least one input button for calling a function associated with a keyboard layout in various forms.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses certain embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, certain embodiments of the present disclosure may be described with reference to accompanying drawings. Accordingly, those of ordinary skill in the art will recognize that modification, equivalent, and/or alternative on the certain embodiments described herein can be variously made without departing from the scope and spirit of the present disclosure.

Figure 1:
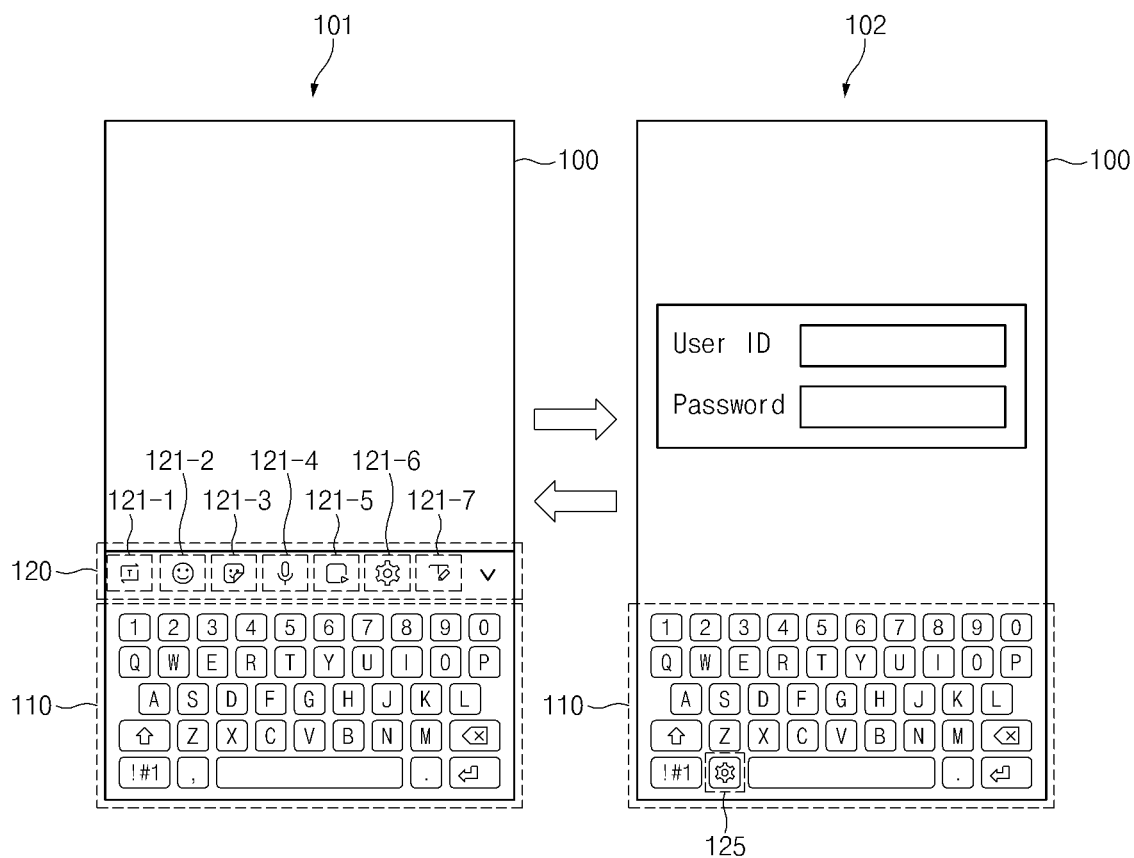
FIG. 1 is a drawing illustrating an operation of displaying a user interface (UI) including at least one input button associated with a keyboard layout according to certain embodiments.

FIG. 1 is a drawing illustrating an operation of displaying a user interface (UI) 120 including at least one input button associated with a keyboard layout 110 according to certain embodiments.

Figure 2:
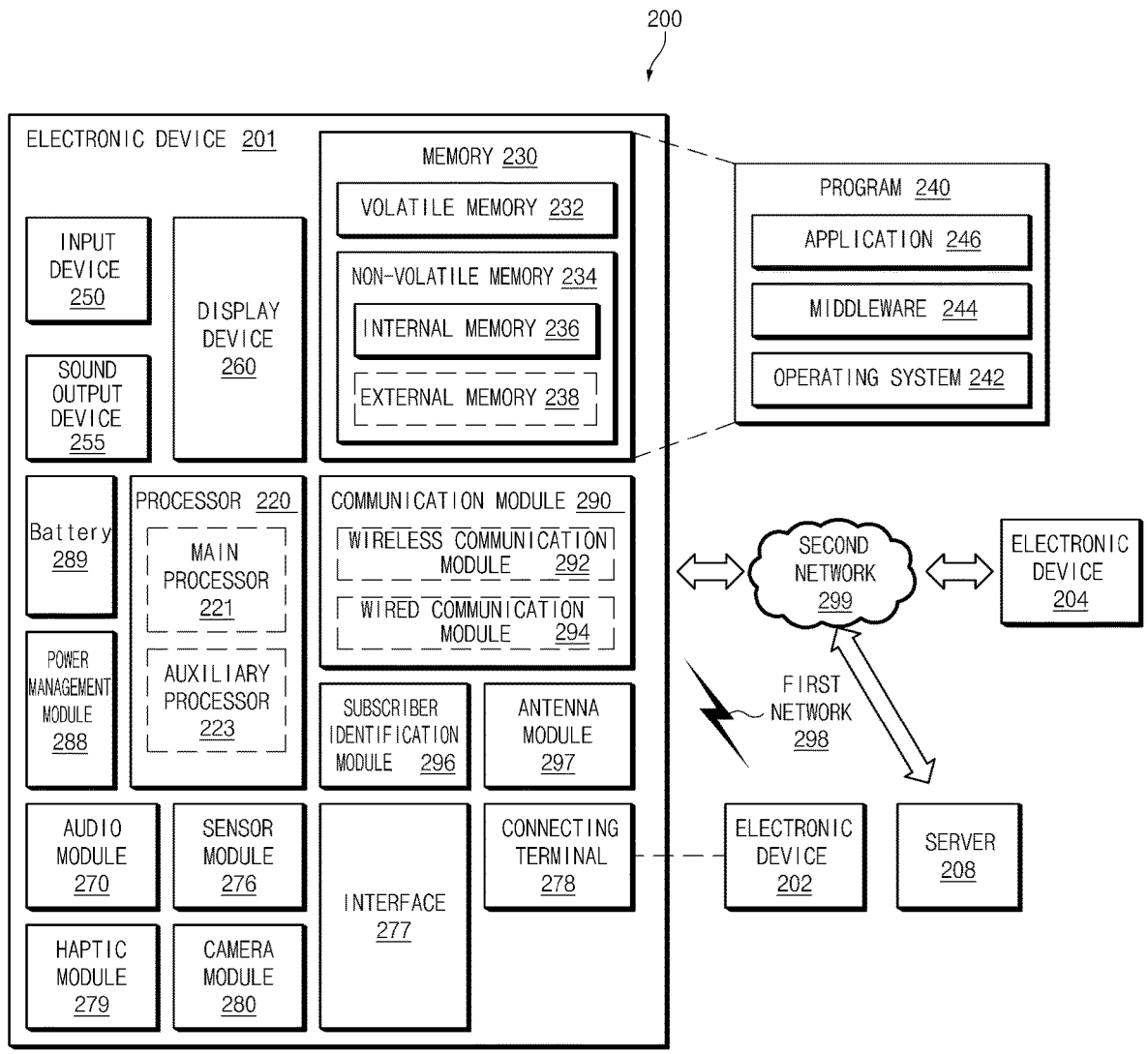
FIG. 2 is a block diagram illustrating a configuration of an electronic device in a network environment according to certain embodiments.

Referring to FIG. 1, an electronic device (e.g., an electronic device 201 of FIG. 2) may display a keyboard layout or a number keypad capable of receiving a user input on a display (e.g., a display device 260 of FIG. 2). For example, referring to reference numeral 101 of FIG. 1, when an application stored in the electronic device is executed, the electronic device may display a keyboard layout 110 within a screen 100 of the application (such as a text editing screen). The application may include an application for providing a function for allowing a user of the electronic device to enter text, for example, a memo application, a word processing application, a short message service (SMS) or multimedia message service (MMS) application, a social network service (SNS) application, an instant message (IM) application, a browser application, a setting application, or an e-mail application. Although certain embodiments may include execution of an application, certain embodiments can include operations of the main screen without execution of an application.

According to an embodiment, the electronic device may display the keyboard layout 110 on a partial region of the screen 100. In FIG. 1, the keyboard layout 110 (or the alphanumeric keyboard or ASCII keyboard) is displayed on a lower region of the screen 100, but a location of a region where the keyboard 110 is displayed is not limited to the example shown in FIG. 1. For example, the keyboard 110 can be located at the sides of the screen 100. In certain embodiments, the keyboard 110 can located at the top or bottom of the screen 100, and when the screen is rotated 90 degrees, the keyboard 110 can move to the top or bottom of the screen 100, which was previously a side of the screen 100.

According to an embodiment, the electronic device may display a UI 120, including at least one input button 121-1, 121-2, 121-3, 121-4, 121-5, 121-6, or 121-7 for calling a function associated with the keyboard layout 110, on a region adjacent to the keyboard layout 110. For example, the electronic device may display the UI 120 at an upper end of the keyboard layout 110. According to another embodiment, the electronic device may display the UI 120 within a region where the keyboard layout 110 is displayed such that the UI 120 is included in the keyboard layout 110.

According to an embodiment, the keyboard layout 110 and the UI 120 may be generated by the same application. For example, the UI 120 may be generated by an application (e.g., a keyboard application) which generates the keyboard layout 110. The function associated with the keyboard layout 110 may include, for example, an emoticon, an emoji, speech recognition, setting, automatic word completion, or the like. According to an embodiment, the UI 120 may be referred to as a keyboard dedicated toolbar.

Forms, the number, and an array of buttons included in the UI 120 are not limited to the example shown in FIG. 1, and other forms are permitted. For example, in FIG. 1, an embodiment is exemplified as the UI 120 includes the at least one input button 121-1, 121-2, 121-3, 121-4, 121-5, 121-6, or 121-7 for calling the function associated with the keyboard layout 110. However, embodiments are not limited thereto. For example, the UI 120 may further include at least one symbol button (e.g., a comma (,), a question mark (?), an exclamation mark (!), a slash (/), or an at sign (@)) capable of supporting a function of the keyboard layout 110.

According to an embodiment, the electronic device might or might not display the UI 120 within the screen 100 based on a specified condition. According to an embodiment, the specified condition may include whether there is another UI (e.g., an application dedicated toolbar) in the screen 100. For example, when there is the other UI in the screen 100, as shown in numeral number 102 of FIG. 1, the electronic device may fail to display the UI 120 and may display an input button 125 for calling the UI 120 within the screen 100. For example, the electronic device may display the input button 125 within the keyboard layout 110. When receiving a user input (e.g., a touch input, a pressure input, a hovering input, a swipe input, or a long press input) selecting the input button 125, as shown in reference numeral 101, the electronic device may display the UI 120 (notwithstanding, and in addition to the other UI) on a region adjacent to the keyboard layout 110 and may change the input button 125 to another button (e.g., a comma button).

Through the above-mentioned method, the electronic device may reduce errors by selectively displaying the UI 120 based on whether there is another UI in the screen 100. According to an embodiment, whether the electronic device displays the UI 120 on its display, and the condition where the electronic device displays the UI 120, may be determined by a user setting. For example, when receiving a user input for setting whether to display the UI 120 to "on", the electronic device may the UI 120 on the display irrespective of a specified condition. For another example, when receiving a user input for setting whether to display the UI 120 to "off", the electronic device may fail to display the UI 120 on the display irrespective of the specified condition. According to another embodiment, the electronic device displays the UI 120 on settable conditions such as most recent use (for example, if the user has selected button 125 the most recent time that the keyboard layout 110 was displayed without UI 125).

FIG. 2 is a block diagram illustrating an electronic device 201 in a network environment 200 according to certain embodiments.

Referring to FIG. 2, the electronic device 201 in the network environment 200 may communicate with an electronic device 202 via a first network 298 (e.g., a short-range wireless communication network), or an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments, at least one (e.g., the display device 260 or the camera module 280) of the components may be omitted from the electronic device 201, or one or more other components may be added in the electronic device 201. In some embodiments, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may load a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input device 250 may receive a command or data to be used by other component (e.g., the processor 220) of the electronic device 201, from the outside (e.g., a user) of the electronic device 201. The input device 250 may include, for example, a microphone, a mouse, a keyboard, or a digital pen (e.g., a stylus pen).

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment, the audio module 270 may obtain the sound via the input device 250, or output the sound via the sound output device 255 or a headphone of an external electronic device (e.g., an electronic device 202, a speaker, or a head-phone) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth, wireless-fidelity (Wi-Fi) direct, or infrared data association (IrDA)) or the second network 299 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., PCB). According to an embodiment, the antenna module 297 may include a plurality of antennas. In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 and 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

Figure 3:
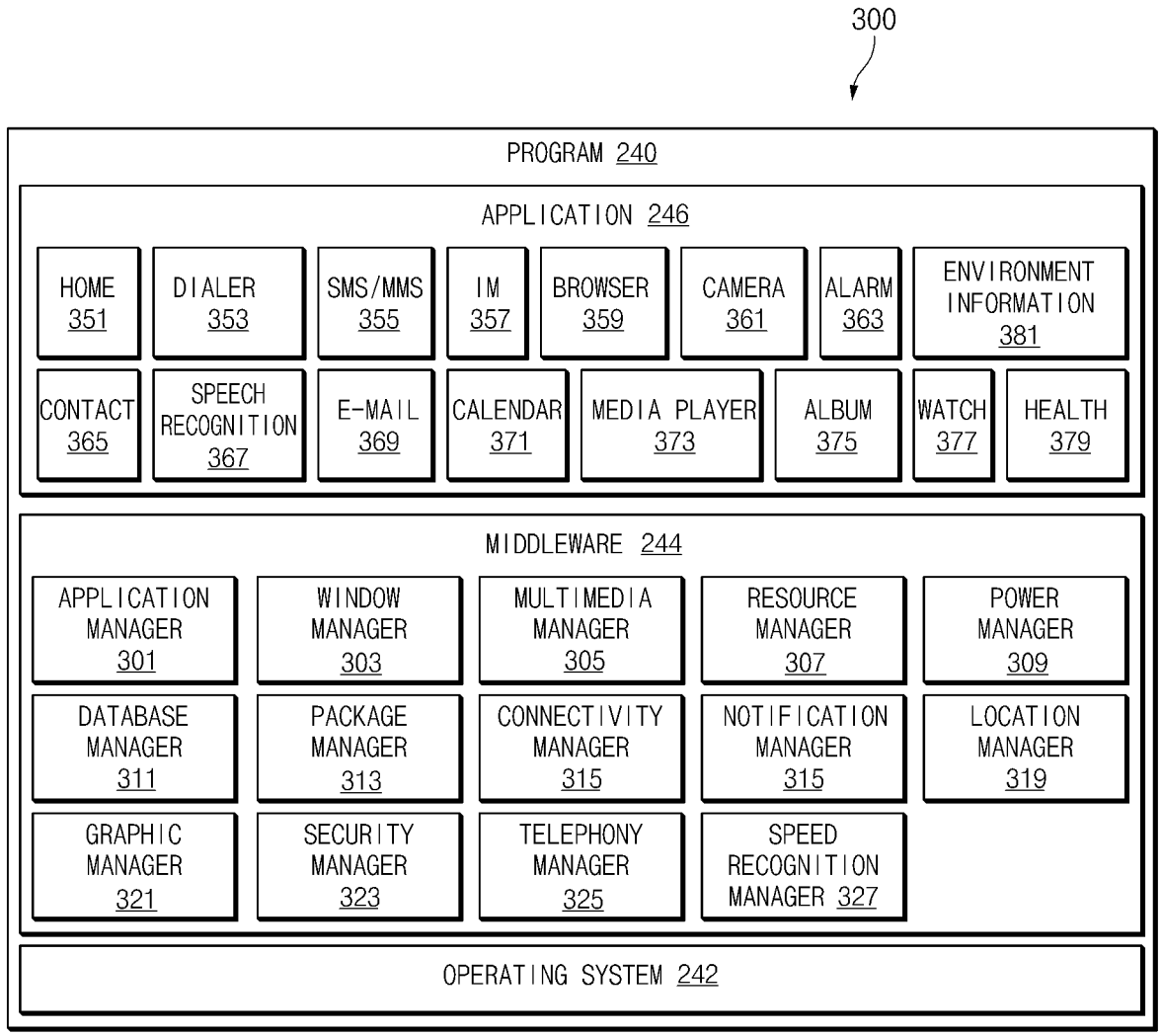
FIG. 3 is a block diagram illustrating a program according to certain embodiments.

FIG. 3 is a block diagram 300 illustrating a program 240 according to certain embodiments. According to an embodiment, the program 240 may include an operating system (OS) for controlling one or more resources of an electronic device 201 of FIG. 2, middleware 244, and an application 246 executable by the OS 242. The OS 242 may include, for example, Android™, iOS™, Windows™, Symbian™, Tizen™, or Bada™. For example, at least a portion of the program 240 may be preloaded on the electronic device 201 when the electronic device 201 is manufactured or may be downloaded and updated from an external electronic device (e.g., an electronic device 202 or 204 or a server 106 of FIG. 2) when the electronic device 201 is used by a user.

The OS 242 may control to manage (e.g., assign or collect) one or more system resources (e.g., a process, a memory, or a power supply) of the electronic device 201. Additionally or alternatively, the OS 242 may include one or more driver programs for driving another hardware device of the electronic device 201, for example, an input device 250, a sound output device 255, a display device 260, an audio module 270, a sensor module 276, an interface 277, a haptic module 279, a camera module 280, a power management module 288, a battery 289, a communication module 290, a subscriber identification module 296, or an antenna module 297 of FIG. 2.

The middleware 330 may provide various functions to the application 246 such that functions or information provided from one or more resources of the electronic device 201 may be used by the application 246. The middleware 244 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a speech recognition manager 327.

The application manager 301 may manage, for example, a life cycle of the application 246. The window manager 303 may manage, for example, one or more graphic user interface (GUI) resources used in a screen. The multimedia manager 305 may identify, for example, one or more formats necessary for playing media files and may encode or decode a corresponding media file among the media files using a codec suitable for the format selected among the one or more formats. The resource manager 307 may manage, for example, a source code of the application 246 or a space of a memory 230 of FIG. 2. The power manager 309 may manage, for example, capacity, temperature, or power of the battery 289 and may determine or provide information associated with an operation of the electronic device 201 using the corresponding information among the capacity, the temperature, or the power of the battery 289. According to an embodiment, the power manager 309 may interwork with a basic input/output system (BIOS) (not shown) of the electronic device 201.

The database manager 311 may generate, search, or modify a database to be used by the application 246. The package manager 313 may manage to install or update, for example, an application distributed in the form of a package file. The connectivity manager 315 may manage, for example, a wireless connection or a direct connection between the electronic device 201 and the external electronic device. The notification manager 317 may provide, for example, a function for notifying a user that a specified event (e.g., an incoming call, a message, or an alarm) occurs. The location manager 319 may manage, for example, location information of the electronic device 201. The graphic manager 321 may manage, for example, one or more graphic effects to be provided to the user or may manage a UI associated with the graphic effects.

The security manager 323 may provide, for example, system security or user authentication. The telephony manager 325 may manage, for example, a voice or video call function provided by the electronic device 201. The speech recognition manager 327 may transmit, for example, voice data of the user to a server 208 of FIG. 2 and may receive a command corresponding to a function to be performed in the electronic device 201 based in part on the voice data or text data converted based in part on the voice data from the server 208. According to an embodiment, the middleware 244 may dynamically fail to include some of the existing components or may further include new components. According to an embodiment, at least a portion of the middleware 244 may be included as a portion of the OS 242 or may be implemented as software independent of the OS 242.

The application 246 may include, for example, a home application 351, a dialer application 353, an SMS/MMS application 355, an instant message (IM) application 357, a browser application 359, a camera application 361, an alarm application 363, a contact application 365, a speed recognition application 367, an e-mail application 369, a calendar application 371, a media player application 373, an album application 375, a watch application 377, a health application 379 (e.g., an application for measuring biometric information such as an exercise quantity or blood sugar), or an environment information application 381 (e.g., an application for measuring information about barometric pressure, humidity, or temperature). According to an embodiment, the application 246 may further include an information exchanging application (not shown) capable of supporting information exchange between the electronic device 201 and the external electronic device. The information exchanging application may include, for example, a notification relay application configured to transmit specific information (e.g., a call, a message, or an alarm) to the external electronic device or a device management application configured to manage the external electronic device. For example, the notification relay application may transmit notification information corresponding to a specified event (e.g., mail reception) which occurs in another application (e.g., the e-mail application 369) of the electronic device 201 to the external electronic device. Additionally or alternatively, the notification relay application may receive notification information from the external electronic device and may provide the received notification information to a user of the electronic device 201.

The device management application may control, for example, a power (e.g., turn-on/turn-off of the power) of the external electronic device which communicates with the electronic device 201 and a power of each of some (e.g., a display device 260 or a camera module 280) of the components of the electronic device 201 or may control a function (e.g., brightness, resolution, or focus) of each of some (e.g., the display device 260 or the camera module 280) of the components of the electronic device 201. Additionally or alternatively, the device management application may support to install, delete, or update an application which operates in the external electronic device.

Figure 4:
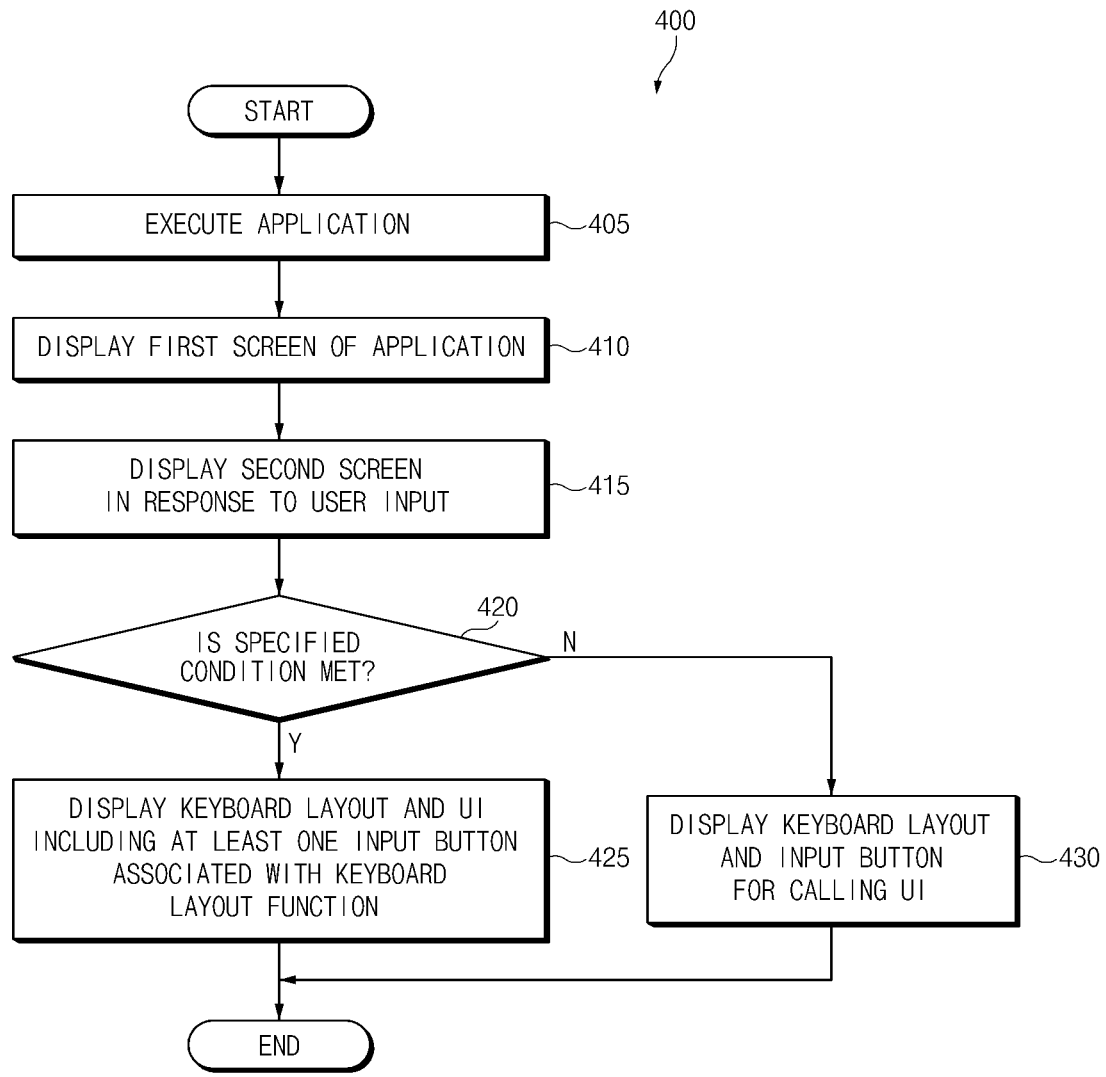
FIG. 4 is a flowchart illustrating an operation of an electronic device for displaying a UI according to certain embodiments.

FIG. 4 is a flowchart illustrating an operation of an electronic device 201 for displaying a UI 120 according to certain embodiments. Operations shown in FIG. 4 may be performed by the electronic device 201 or a component (e.g., a processor 220) included in the electronic device 201.

Referring to FIG. 4, in operation 405 of a method 400, the electronic device 201 (e.g., the processor 220) may execute an application stored in a memory 230 of FIG. 2. The application may include one of, for example, applications included in an application 246 described with reference to FIG. 3. For another example, the application may include a memo application, word processing, an SMS, MMS, an SNS application, an instant message (IM)) application, a browser application, a setting application, or an e-mail application.

In operation 410, the electronic device 201 may display a first screen of the application in response to the execution of the application. According to an embodiment, the first screen may include an input field or a text input button (a button for requesting a keyboard, as will be shown in FIG. 5, reference 512).

In operation 415, the electronic device 201 may display a second screen (e.g., a screen 100 of FIG. 1) for allowing its user to enter text, in response to a user input for selecting the input field or the text input button included in the first screen. For example, the second screen may include a keyboard layout or a number keypad.

In operation 420, the electronic device 201 may determine whether a specified condition is met. According to an embodiment, the specified condition may include whether there is a UI associated with the executed application in the second screen. For example, when there is no the UI associated with the application in the second screen (i.e., when the specified condition is met), the electronic device 201 may perform operation 425. For another example, when there is the UI associated with the application in the second screen (i.e., when the specified condition is not met), the electronic device 201 may perform operation 430.

When the specified condition is met, in operation 425, the electronic device 201 may display a keyboard layout 110 of FIG. 1 and a UI 120, including at least one input button (e.g., at least one of input buttons 121-1, 121-2, 121-3, 121-4, 121-5, 121-6, or 121-7 of FIG. 1) for providing a function associated with the keyboard layout 110, within the second screen.

When the specified condition is not met, in operation 430, the electronic device 201 might not display the UI 120 within the second screen and may display the keyboard layout 110 and an input button 125 for calling the UI 120. According to an embodiment, the electronic device 201 may display the input button 125 within the keyboard layout 110.

Figure 5A:
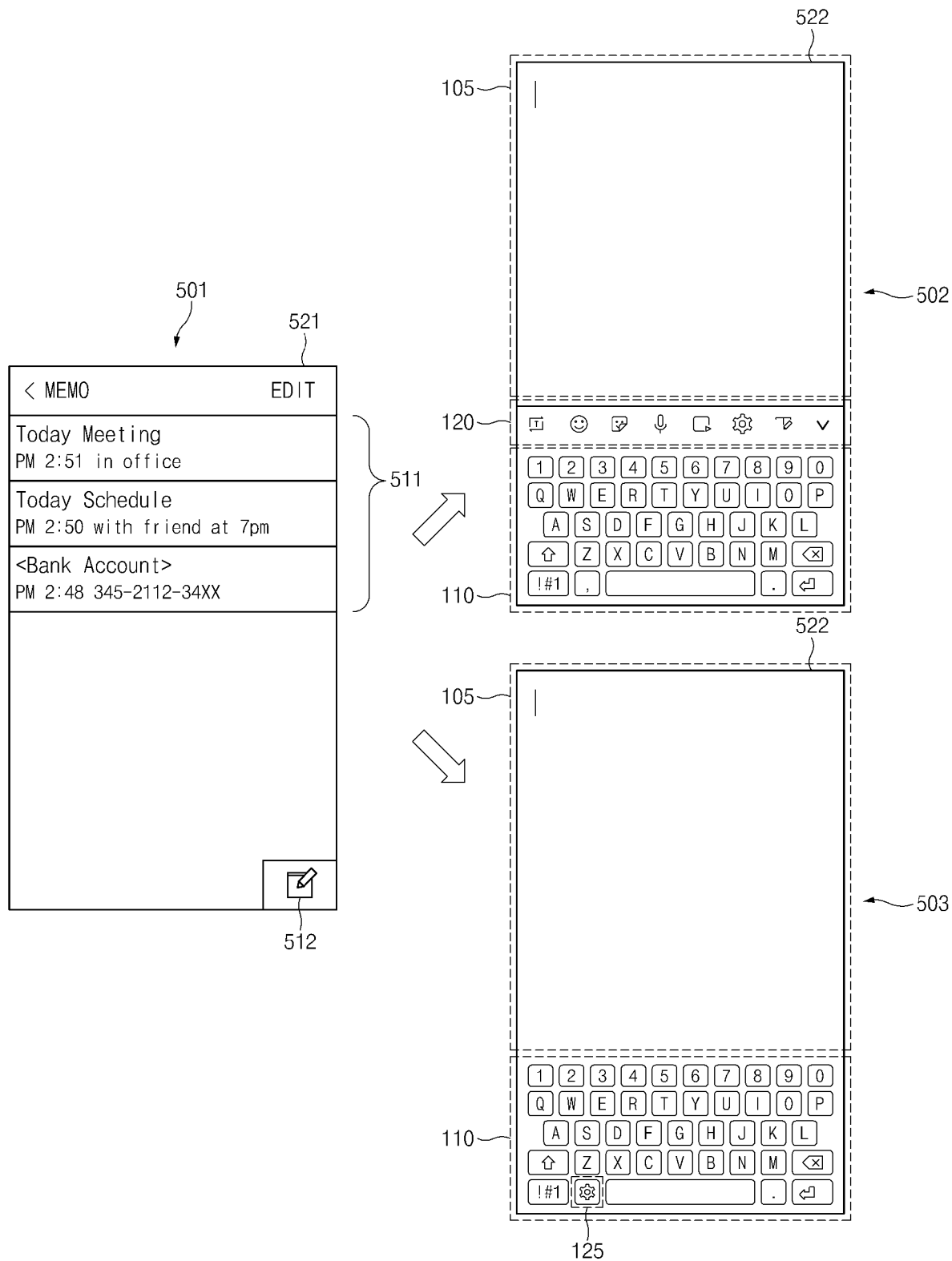
FIG. 5A is a drawing illustrating an operation of displaying a UI when a memo application is executed, according to certain embodiments.

FIG. 5A is a drawing illustrating an operation of displaying a UI 120 when a memo application is executed, according to certain embodiments.

Referring to reference numeral 501 of FIG. 5A, an electronic device 201 (e.g., a processor 220) of FIG. 2 may display a first screen 521 (step 410) on a display (e.g., a display device 260 of FIG. 2) in response to executing a memo application (step 405). According to an embodiment, the first screen 521 may include a memo list 511 including at least one memo and a text input button 512. When receiving a user input for selecting the memo list 511 or the text input button 512, the electronic device 201 may display a second screen 522 (step 415) for allowing its user to enter text.

According to an embodiment, the second screen 522 may include the keyboard layout 110 and an input field 105 on which text is output according to a user input received through the keyboard layout 110. For example, the electronic device 201 may display the keyboard layout 110 at a lower end of the input field 105.

According to an embodiment, the electronic device 201 may or may not display a UI 120, including at least one input button for calling a function associated with the keyboard layout 110, based on whether a specified condition is met (step 420). When the specified condition is met (step 425), as shown in reference numeral 502 of FIG. 5A, the electronic device 201 may display the UI 120 within the second screen 522. For example, the electronic device 201 may display the UI 120 on a region adjacent to the keyboard layout 110 or within the keyboard layout 110. When the specified condition is not met (step 430), as shown in reference numeral 503 of FIG. 5A, the electronic device 201 may fail to display the UI 120 within the second screen 522 and may display an input button 125 for calling the UI 120. For example, the electronic device 201 may display the input button 125 within the keyboard layout 110.

Figure 5B:
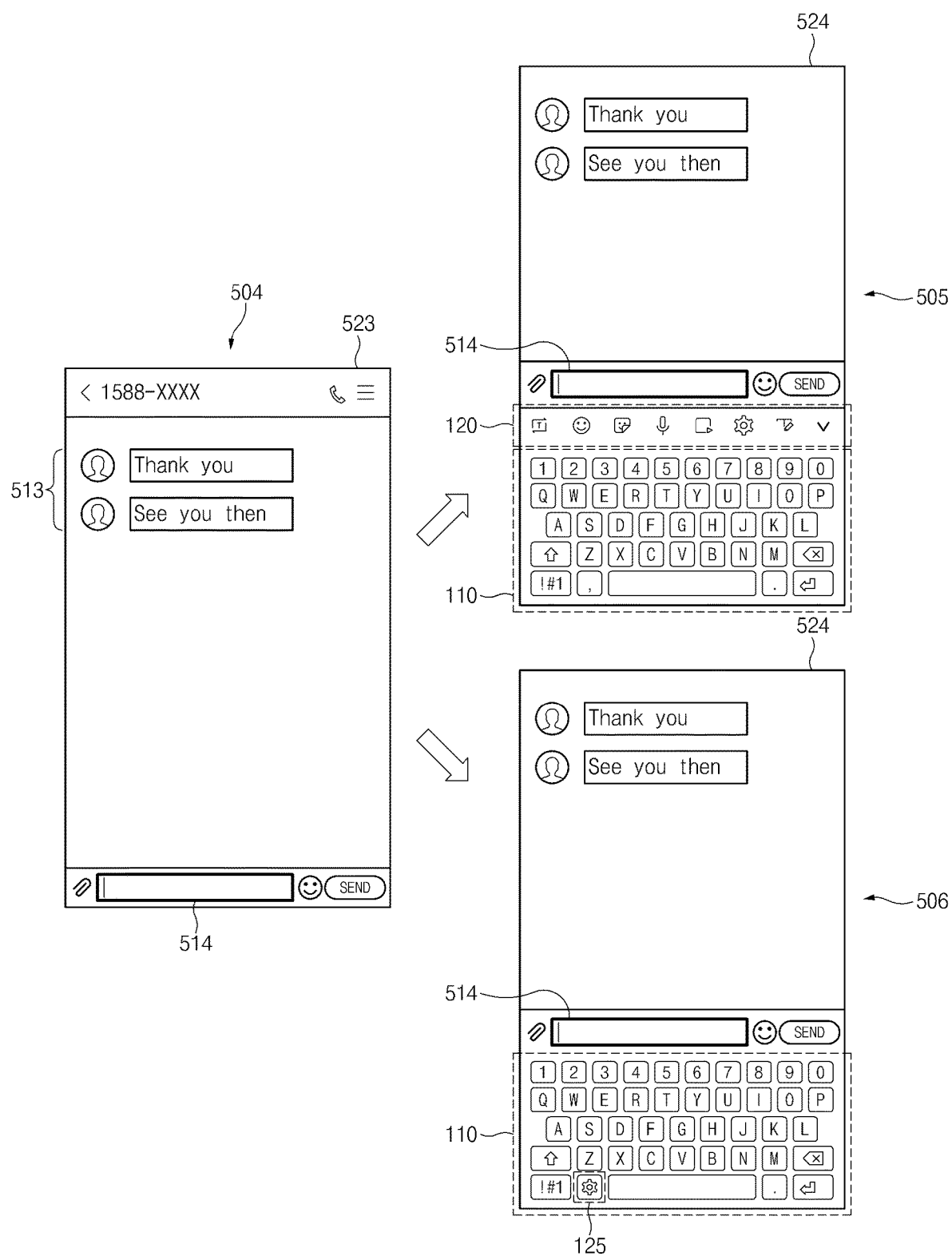
FIG. 5B is a drawing illustrating an operation of displaying a UI when a message application is executed, according to certain embodiments.

FIG. 5B is a drawing illustrating an operation of displaying a UI 120 when a message application (e.g., an SMS, MMS, or IM application) is executed, according to certain embodiments.

Referring to reference numeral 504 of FIG. 5B, an electronic device 201 (e.g., a processor 220) of FIG. 2 may display a first screen 523 (step 410) on a display (e.g., a display device 260 of FIG. 2) in response to executing the message application (step 405). According to an embodiment, the first screen 523 may include a message list 513 indicating at least one received or transmitted message and an input field 514. When receiving a user input for selecting the input field 514, the electronic device 201 may display a second screen 524 (step 415). The second screen 524 may include a keyboard layout 110 and the input field 514. For example, the electronic device 201 may display the keyboard layout 110 at a lower end of the input field 514.

According to an embodiment, the electronic device 201 may or may not display or fail to display the UI 120 based on whether a specified condition is met (step 420). When the specified condition is met, as shown in reference numeral 505 of FIG. 5B, the electronic device 201 may display the UI 120 within the second screen 524 (step 425). For example, the electronic device 201 may display the UI 120 on a region adjacent to the keyboard layout 110 or within the keyboard layout 110. When the specified condition is not met, as shown in reference numeral 506 of FIG. 5B, the electronic device 201 might not display the UI 120 (step 430) within the second screen 524 and may display an input button 125. For example, the electronic device 201 may display the input button 125 within the keyboard layout 110.

Figure 5C:
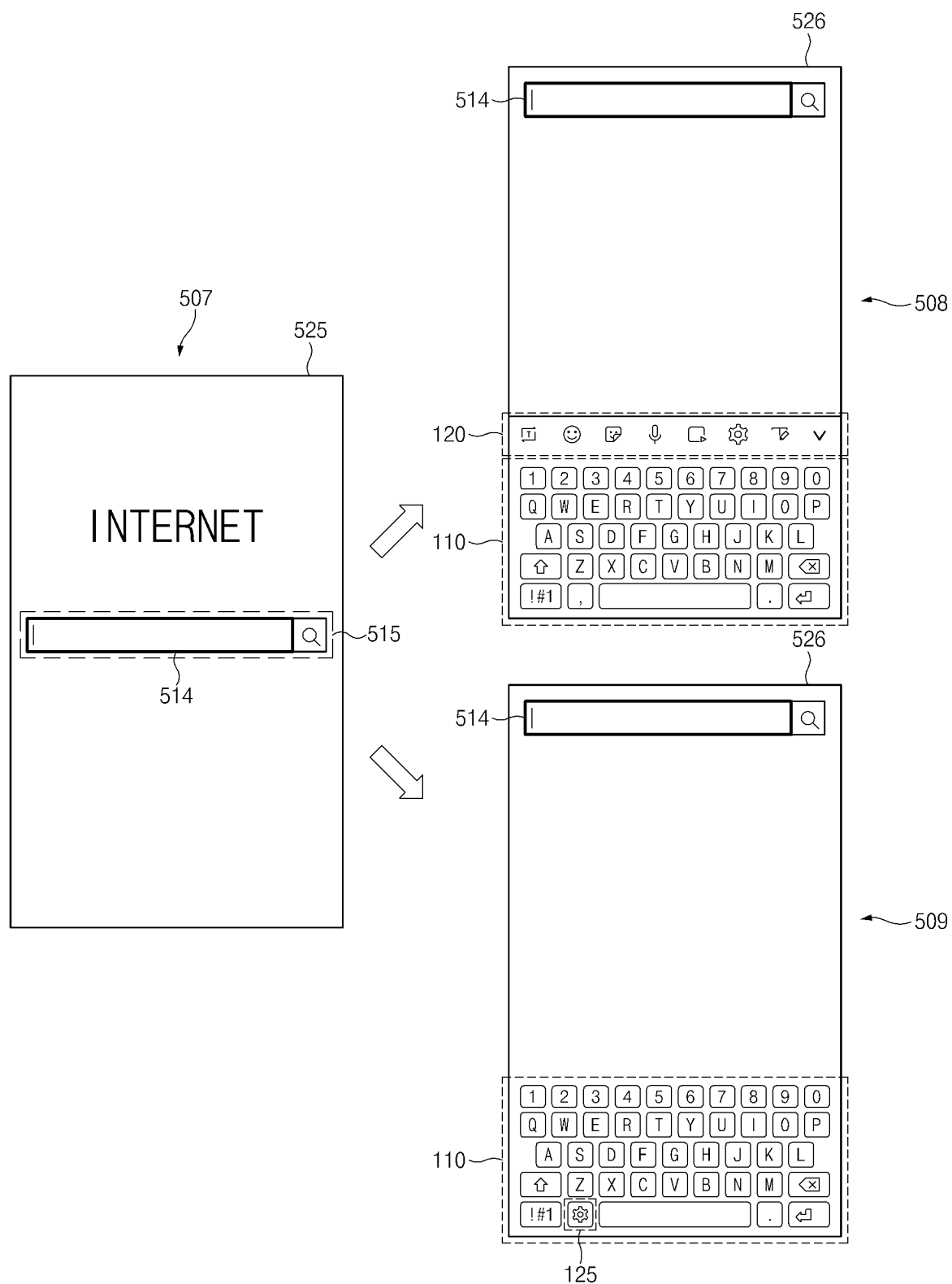
FIG. 5C is a drawing illustrating an operation of displaying a UI when a browser application is executed, according to certain embodiments.

FIG. 5C is a drawing illustrating an operation of displaying a UI 120 when a browser application is executed, according to certain embodiments.

Referring to reference numeral 507 of FIG. 5C, an electronic device 201 (e.g., a processor 220) of FIG. 2 may display a first screen 525 (step 410) on a display (e.g., a display device 260 of FIG. 2) in response to executing the browser application (step 405). The first screen 525 may refer to, for example, a start page of a web browser. According to an embodiment, the first screen 525 may include a search field 515 for providing a search function. When receiving a user input for selecting an input field 514 in the search field 515, the electronic device 201 may display a second screen 526 (step 415).

According to an embodiment, the second screen 526 may include a keyboard layout 110 and the input field 514. For example, the electronic device 201 may display the keyboard layout 110 at a lower end of the input field 514.

According to an embodiment, the electronic device 201 may or may display the UI 120 based on whether a specified condition is met (step 420). When the specified condition is met, as shown in reference numeral 508 of FIG. 5C, the electronic device 201 may display the UI 120 within the second screen 526 (step 425). For example, the electronic device 201 may display the UI 120 on a region adjacent to the keyboard layout 110 or within the keyboard layout 110. When the specified condition is not met, as shown in reference numeral 509 of FIG. 5C, the electronic device 201 might not display the UI 120 within the second screen 524 and may display an input button 125 (step 430). For example, the electronic device 201 may display the input button 125 within the keyboard layout 110.

Figure 6:
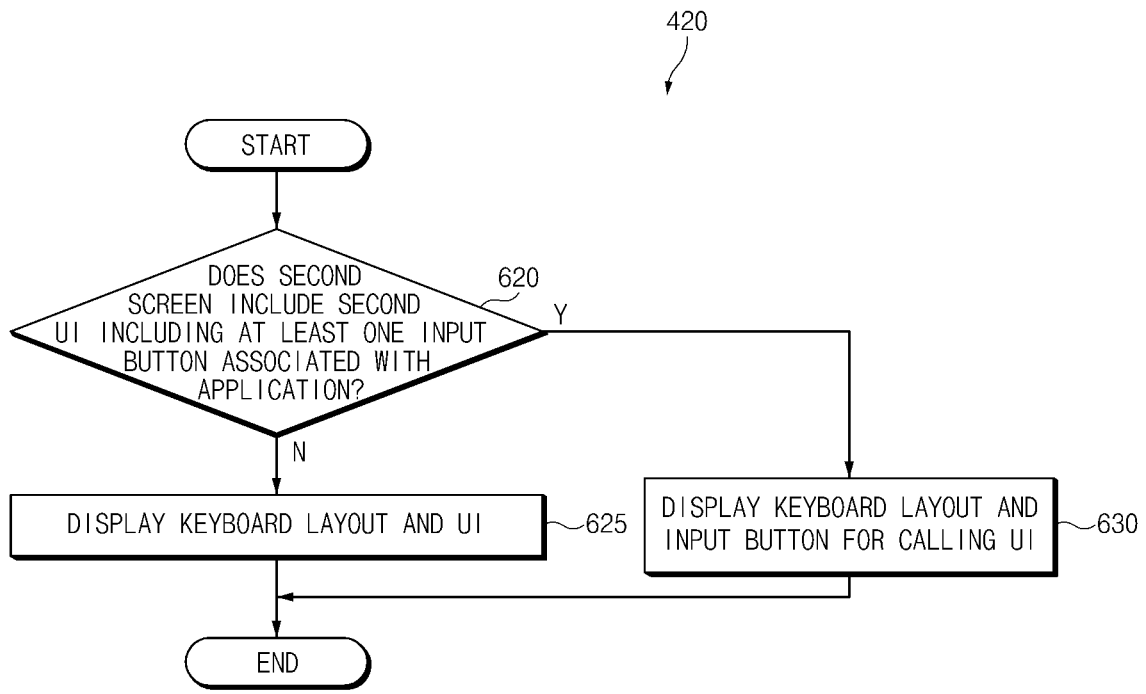
FIG. 6 is a flowchart illustrating an operation of an electronic device for displaying a UI based on a second UI associated with an application, according to certain embodiments.

FIG. 6 is a flowchart illustrating an operation of an electronic device 201 for displaying a UI 120 based on a second UI associated with an application, according to certain embodiments. Operations shown in FIG. 6 may refer to operations in which operation 420 of FIG. 4 is specifically performed.

Referring to FIG. 6, when displaying a second screen on a display of the electronic device 201 in response to a user input, in operation 620, the electronic device 201 may determine whether the second screen includes at least one input button associated with an application. The second screen may refer to, for example, a screen 110 of FIG. 1, a second screen 522 of FIG. 5A, a second screen 524 of FIG. 5B, or a second screen 526 of FIG. 5C. According to an embodiment, the electronic device 201 may perform operation 620 concurrently or sequentially with an operation (e.g., operation 415 of FIG. 4) of displaying the second screen.

According to an embodiment, the second UI may be generated or controlled by an application (e.g., a memo application, a message application, or a browser application) executed in the electronic device 201. According to an embodiment, the at least one input button included in the second UI may call a function associated with an application executed in the electronic device 201. For example, when the message application or an SNS application is executed in the electronic device 201, a function associated with the application may include photo upload, video upload, file attachment, or contact sharing. For another example, when a setting application is executed in the electronic device 201, an input button included in the second UI may include a confirm button or a cancel button. According to an embodiment, the second UI may be referred to as an application dedicated toolbar.

When the second screen does not include the second UI, in operation 625, the electronic device 201 may display the UI 120 together with the keyboard layout 110 within the second screen.

When the second screen includes the second UI, in operation 630, the electronic device 201 may fail to display the UI 120 and may display an input button 125 for calling the UI 120 within the second screen.

Figure 7A:
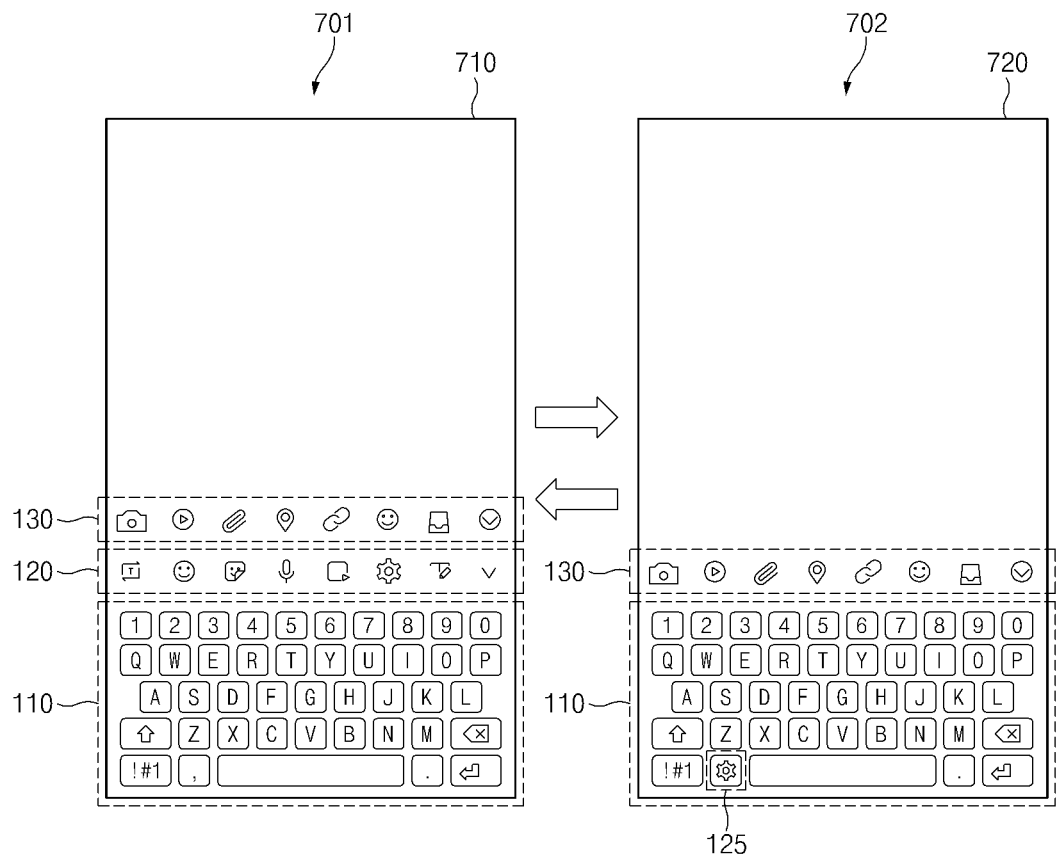
FIG. 7A is a drawing illustrating an example of an operation of displaying a UI based on a second UI associated with an application, according to certain embodiments.

FIG. 7A is a drawing illustrating an example of an operation of displaying a UI 120 based on a second UI 130 associated with an application, according to certain embodiments.

Referring to reference numeral 701 of FIG. 7A, an electronic device 201 (e.g., a processor 220) of FIG. 2 may display a first screen 710 including an input field 514 (e.g., a first screen 521 of FIG. 5A, a first screen 523 of FIG. 5B, or a first screen 525 of FIG. 5C) on its display. Although not illustrated in FIG. 7A, according to an embodiment, the first screen 710 may include a text input button (e.g., a text input button 512 of FIG. 5A) rather than the input field 514.

According to an embodiment, the first screen 710 may include a second UI 130 including at least one input button associated with an application. According to an embodiment, the second UI 130 may include an application dedicated toolbar.

Referring to reference numeral 702 of FIG. 7A, the electronic device 201 may display a second screen 720 (e.g., a second screen 522 of FIG. 5A, a second screen 524 of FIG. 5B, or a second screen 526 of FIG. 5C) for allowing its user to enter text on the display in response to a user input for selecting the input field 514 included in the first screen 710. The electronic device 201 may display a keyboard layout 110 within the second screen 720. According to an embodiment, since the second screen 720 includes the second UI 130, to prevent a problem in which text is incorrectly entered in the second UI 130, the electronic device 201 may fail to display the UI 120 and may display only an input button 125 for calling the UI 120 within the second screen 720. For example, the electronic device 201 may display the input button 125 within the keyboard layout 110.

Referring to reference numeral 703 of FIG. 7A, the electronic device 201 may display a UI 120 within the second screen 720 in response to a user input for selecting the input button 125. For example, the electronic device 201 may display the UI 120 between the keyboard layout 110 and the second UI 130 or within the keyboard layout 110.

Figure 7B:
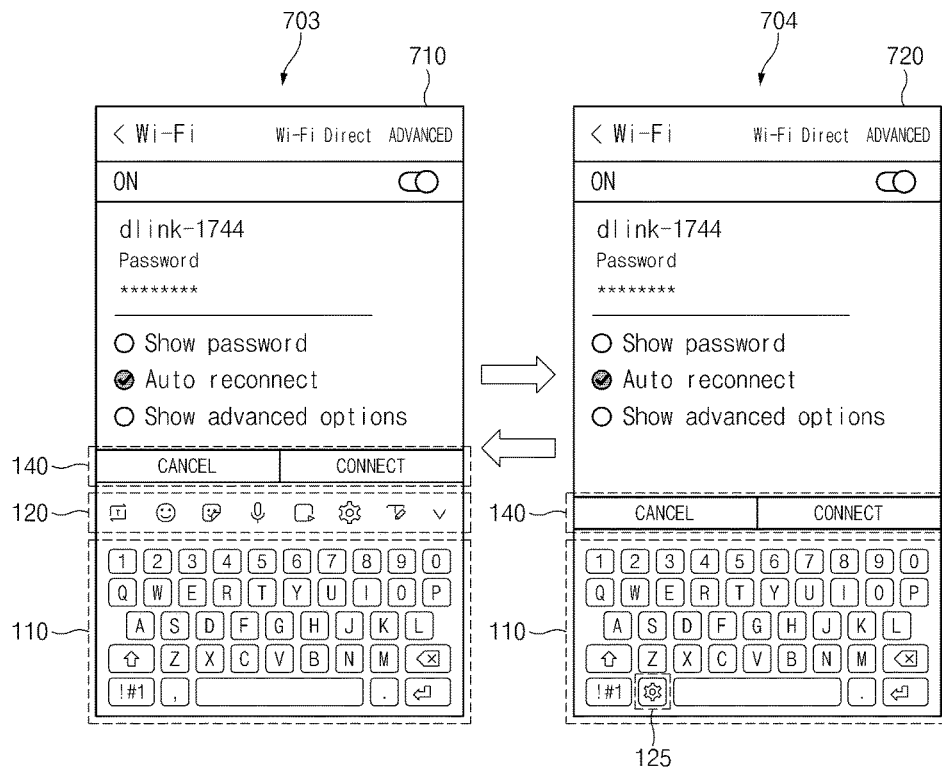
FIG. 7B is a drawing illustrating another example of an operation of displaying a UI based on a second UI associated with an application, according to certain embodiments.

FIG. 7B is a drawing illustrating another example of an operation of displaying a UI 120 based on a second UI 140 associated with an application, according to certain embodiments.

Referring to reference numeral 704 of FIG. 7B, an electronic device 201 (e.g., a processor 220) of FIG. 2 may display a first screen 710 (e.g., a first screen 521 of FIG. 5A, a first screen 523 of FIG. 5B, or a first screen 525 of FIG. 5C) on its display. According to an embodiment, the first screen 710 may include a second UI 130 including a cancel button and a confirm button.

Referring to reference numeral 705 of FIG. 7B, the electronic device 201 may display a second screen 720 (e.g., a second screen 522 of FIG. 5A, a second screen 524 of FIG. 5B, or a second screen 526 of FIG. 5C) for allowing its user to enter text on the display in response to a user input for selecting a partial region except for the second UI 140 within the first screen 710. The electronic device 201 may display a keyboard layout 110 within the second screen 720. According to an embodiment, since the second screen 720 includes the second UI 140, to prevent a problem in which text is incorrectly entered in the second UI 140, the electronic device 201 may fail to display the UI 120 within the second screen 720 and may display only an input button 125 for calling the UI 120 within the second screen 720. For example, the electronic device 201 may display the input button 125 within the keyboard layout 110.

Referring to reference numeral 706 of FIG. 7B, the electronic device 201 may display the UI 120 within the second screen 720 in response to a user input for selecting the input button 125. For example, the electronic device 201 may display the UI 120 between the keyboard layout 110 and the second UI 140 or within the keyboard layout 110.

Figure 8:
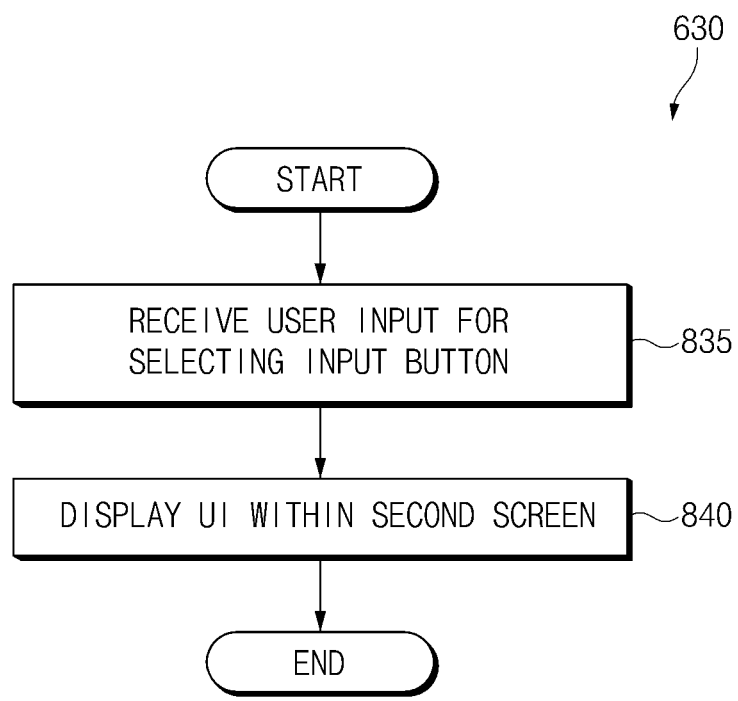
FIG. 8 is a flowchart illustrating an operation of an electronic device for displaying a UI within a screen in response to a user input, according to certain embodiments.

FIG. 8 is a flowchart illustrating an operation of an electronic device 201 for displaying a UI 120 within a screen in response to a user input, according to certain embodiments. Operations shown in FIG. 8 may refer to operations in which operation 630 of FIG. 6 is specifically performed.

Referring to FIG. 8, when displaying an input button 125 for calling the UI 120 and a keyboard layout 110, in operation 835, the electronic device 201 may receive a user input for selecting the input button 125. For example, the user input may include a touch input, a long press input, a swipe input, or a pressure input.

In operation 840, the electronic device 201 may display the UI 120 within a second screen in response to the user input. According to an embodiment, the electronic device 201 may display the UI 120 in various forms. For example, the electronic device 201 may display the UI 120 to be disposed between the keyboard layout 110 and a second UI 130. For example, the electronic device 201 may display the UI 120 within the keyboard layout 110 (e.g., above the keyboard layout 110). For another example, the electronic device 201 may overlay and display the UI 120 with the second UI 130. For another example, the electronic device 201 may display the UI 120 on the keyboard layout 110 in the form of a pop-up.

Figure 9A:
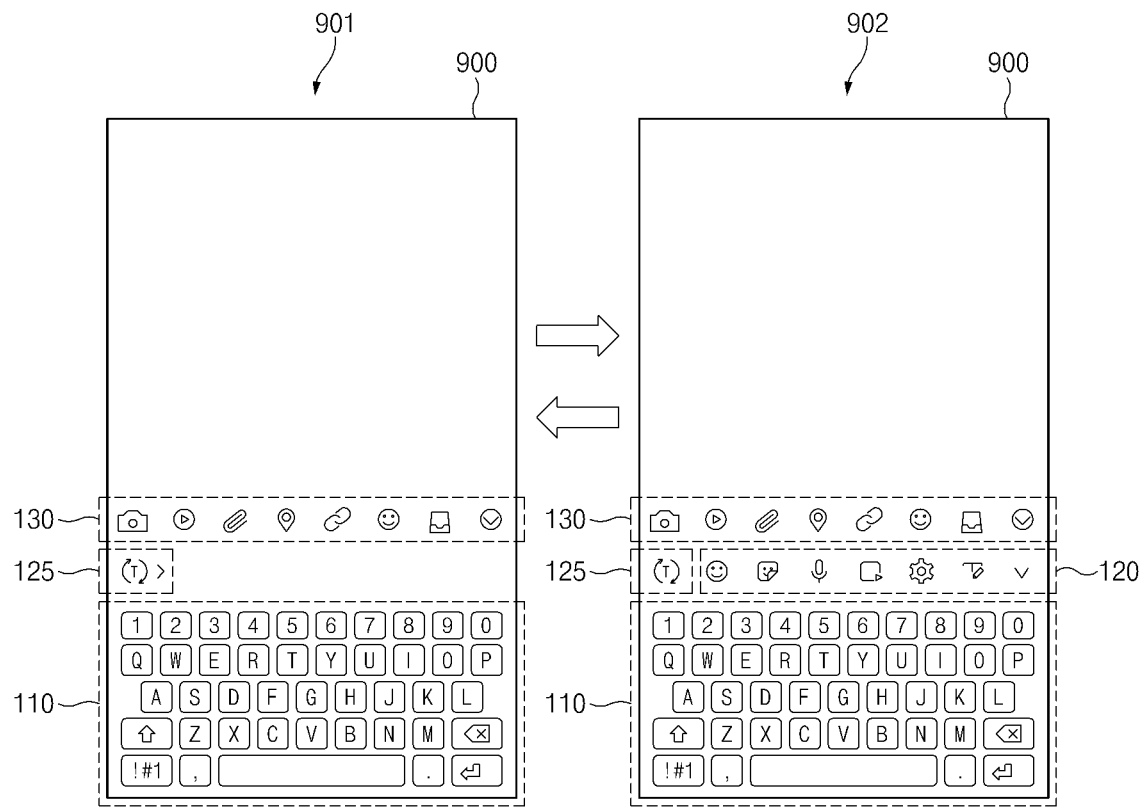
FIG. 9A is a drawing illustrating an operation of displaying a UI at an upper end of a keyboard layout in response to a user input, according to certain embodiments.

FIG. 9A is a drawing illustrating an operation of displaying a UI 120 at an upper end of a keyboard layout 110 in response to a user input, according to certain embodiments. In FIG. 9A, there is a second UI 130 of FIG. 7A. However, the same principle may be applied to a second UI 140 of FIG. 7B.

Referring to reference numeral 901 of FIG. 9A, a second screen 900 may include the keyboard layout 110 and the second UI 130. According to an embodiment, the keyboard layout 110 may be generated by a keyboard application, and the second UI 130 may be generated by an application (e.g., a memory application, a message application, or a browser application) executed in an electronic device 201 of FIG. 2.

According to an embodiment, the electronic device 201 may display an input button 125 for calling the UI 120 at an upper end of the keyboard layout 110. The input button 125 may be generated by, for example, a keyboard application. When receiving a user input for selecting the input button 125, as shown in reference numeral 902 of FIG. 9A, the electronic device 201 may control the UI 120 to indicate an effect in which the UI 120 is spread to the right of the input button 125. When receiving a user input for selecting the input button 125 in a state where the UI 120 is displayed, as shown in reference numeral 901 of FIG. 9A, the electronic device 201 may control the UI 120 to indicate an effect in which the UI 120 is shrunk in a left direction.

Figure 9B:
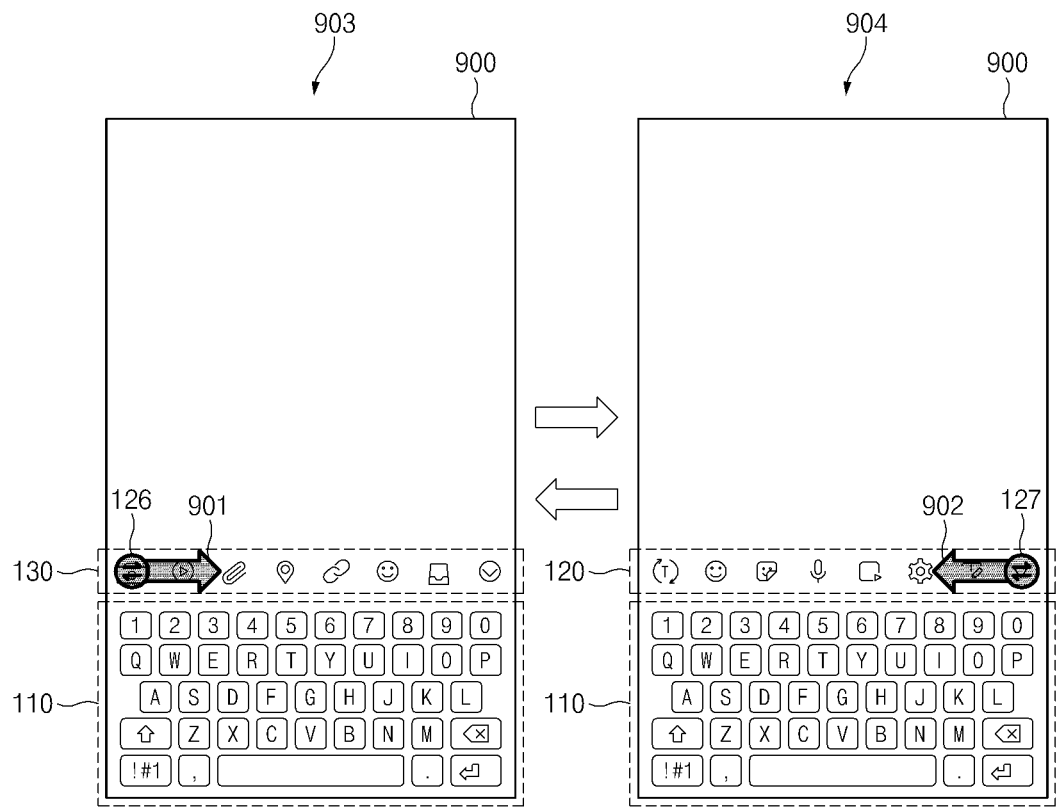
FIG. 9B is a drawing illustrating an operation of overlaying and displaying a UI with a second UI in response to a user input, according to certain embodiments.

FIG. 9B is a drawing illustrating an operation of overlaying and displaying a UI 120 with a second UI 130 in response to a user input, according to certain embodiments. In FIG. 9B a second UI 130 of FIG. 7A is shown. However, the same principle may be applied to a second UI 140 of FIG. 7B.

Referring to reference numeral 903 of FIG. 9B, a second screen 900 may include a keyboard layout 110 and the second UI 130. According to an embodiment, an electronic device 201 of FIG. 2 may display an input button 126 for calling the UI 120 within the second UI 130.

According to an embodiment, while the second UI 130 is displayed, the electronic device 201 may receive a user input for selecting the input button 126. The user input may include, for example, a touch input or an input for swiping the input button 126 (e.g., an input for swiping the input button 126 in the direction of reference numeral 901). As shown in reference numeral 904 of FIG. 9B, the electronic device 201 may control the UI 120 to indicate an effect in which the UI 120 is overlaid with the second UI 130 to be spread in the direction where the input button 126 is swiped. According to an embodiment, the electronic device 201 may display an input button 127 for calling the second UI 130 within the UI 120.

According to an embodiment, while the UI 120 is displayed, the electronic device 201 may receive an input for touching the input button 127 or an input for swiping the input button 127 (e.g., an input for swiping the input button 127 in the direction of reference numeral 902). As shown in reference numeral 904 of FIG. 9B, the electronic device 201 may control the second UI 130 to indicate an effect in which the second UI 130 is overlaid with the UI 120 to be spread in the direction where the input button 127 is swiped.

Figure 9C:
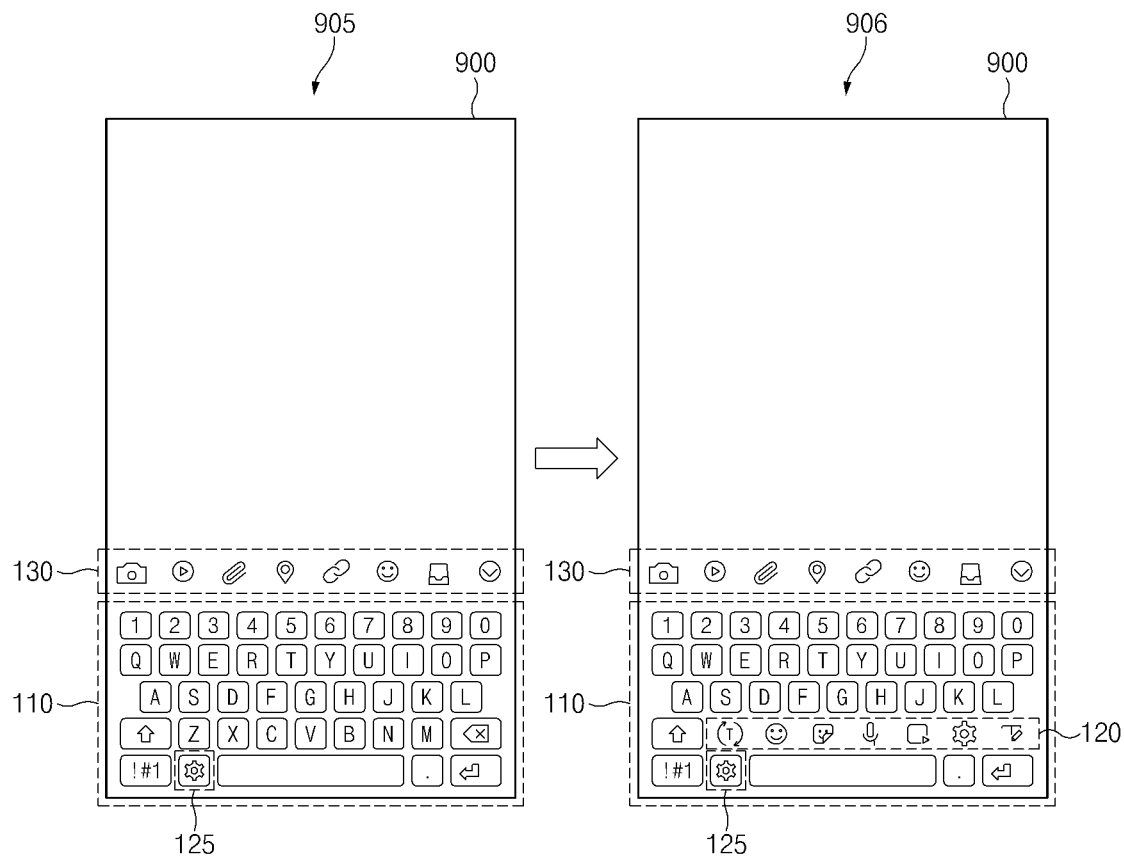
FIG. 9C is a drawing illustrating an operation of displaying a UI in the form of a pop-up in response to a user input, according to certain embodiments.

FIG. 9C is a drawing illustrating an operation of displaying a UI 120 in the form of a pop-up in response to a user input, according to certain embodiments. In FIG. 9C, there is a second UI 130 of FIG. 7A. However, the same principle may be applied to a second UI 140 of FIG. 7B.

Referring to reference numeral 905 of FIG. 9C, a second screen 900 may include a keyboard layout 110 and the second UI 130. According to an embodiment, an electronic device 201 of FIG. 2 may display an input button 125 for calling the UI 120 within the keyboard layout 110. The electronic device 201 may receive a user input for selecting the input button 125. The user input may include, for example, a touch input, a long press input, or a pressure input.

As shown in reference numeral 906 of FIG. 9C, the electronic device 201 may control the UI 120 to indicate an effect in which the UI 120 is displayed at an upper end of the input button 125 in the form of a pop-up in response to a user input. According to an embodiment, the electronic device 201 may display the UI 120 in various forms. For example, the electronic device 201 may display the UI 120 in one row, two rows, or three rows based on the number of buttons included in the UI 120.

Figure 10:
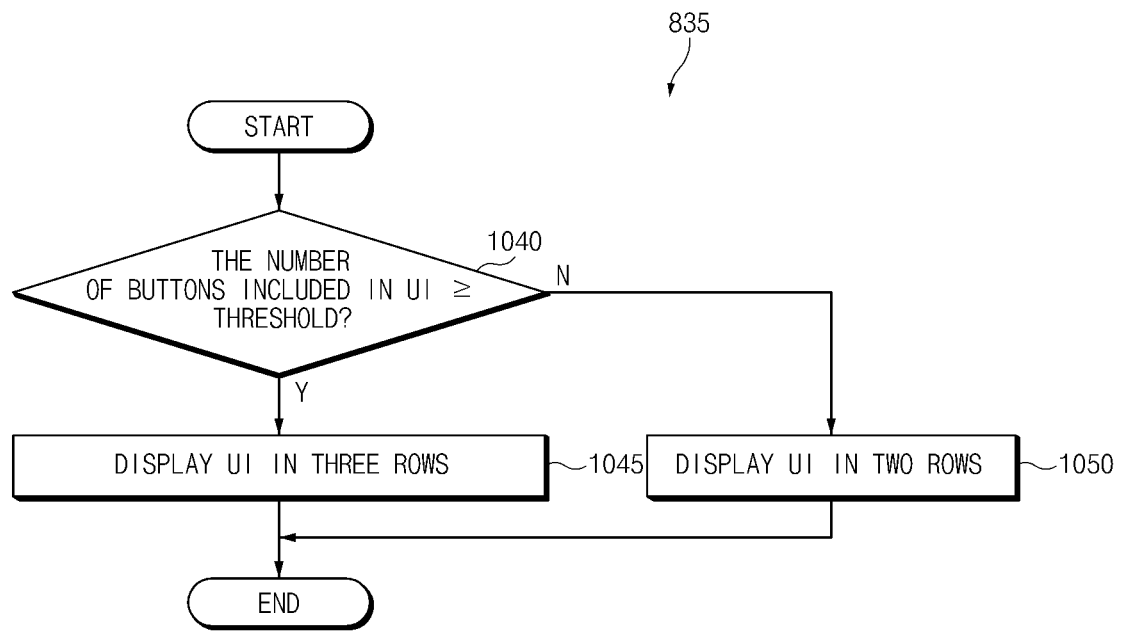
FIG. 10 is a flowchart illustrating an operation of an electronic device for displaying a UI configured with different arrays based on the number of buttons included in the UI, according to certain embodiments.

FIG. 10 is a flowchart illustrating an operation of an electronic device 201 for displaying a UI 120 configured with different arrays based on the number of buttons included in the UI 120, according to certain embodiments. Operations shown in FIG. 10 may refer to operations in which operation 835 of FIG. 8 is specifically performed.

Referring to FIG. 10, when receiving a user input for selecting an input button 125, in operation 1040, an electronic device 201 of FIG. 2 may determine whether the number of buttons included in the UI 120 are greater than or equal to a specified threshold. The buttons included in the UI 120 may include at least one of, for example, an input button for calling a function associated with a keyboard layout 110 or a symbol button. The threshold may refer to, for example, a natural number greater than or equal to 2, such as 7. In some embodiments, the number can be the width dimension divided by 1 cm/0.40 in.

When the number of the buttons is greater than or equal to the threshold, in operation 1045, the electronic device 201 may display the UI 120 in three rows. When the number of the buttons is less than the threshold, in operation 1050, the electronic device 201 may display the UI 120 in two rows.

Figure 11:
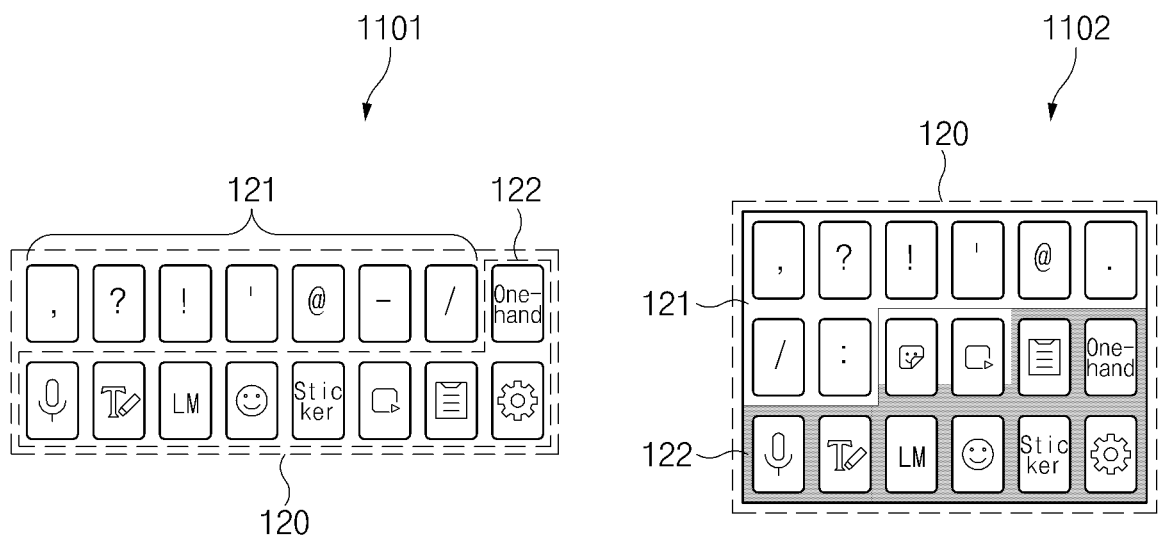
FIG. 11 is a drawing illustrating an operation of displaying a UI configured with different arrays based on the number of buttons included in the UI, according to certain embodiments.

FIG. 11 is a drawing illustrating an operation of displaying a UI 120 configured with different arrays based on the number of buttons included in the UI 120, according to certain embodiments. Reference numeral 1101 of FIG. 11 represents an example in which a UI 120 is displayed in two rows, and reference numeral 1102 represents an example in which the UI 120 is displayed in three rows.

Referring to FIG. 11, the UI 120 may include a plurality of symbol buttons 121 (e.g., a comma (,), a question mark (?), an exclamation mark (!), a slash (/), or an at sign (@)) and a plurality of input buttons 122 for calling a function associated with a keyboard layout 110. According to an embodiment, buttons included in the UI 120 may have priorities, respectively. The buttons of the UI 120 may be disposed based on the priorities. The priorities may be determined by, for example, a frequency of use or a user setting. For example, the electronic device 201 may display the input buttons 122 with high priorities in rows below and may display the symbol buttons 121 with low priorities in rows above. In some embodiments, the electronic device 201 may display input buttons 122 with highest priority in the center, medium priority on the right/left (depending on the user's handedness), and lower priority on the left/right.

According to an embodiment, the electronic device 201 may display differently the UI 120 based on the number of the symbol buttons 121, the number of the input buttons 122, or the total number of the buttons (i.e., the symbol buttons 121 and the input buttons 122) included in the UI 120. For example, when the number of the input buttons 122 is less than a specified threshold (e.g., 10), as shown in reference numeral 1101 of FIG. 11, the electronic device 201 may display the UI 120 configured in two rows. For another example, when the number of the input buttons 122 is greater than or equal to the threshold, as shown in reference numeral 1102 of FIG. 11, the electronic device 201 may display the UI 120 configured in three rows.

According to an embodiment, the electronic device 201 may fix the number of rows configuring the UI 120 to a specified number (e.g., two rows or three rows) and may change a configuration of buttons configuring the UI 120. FIGS. 12A to 12D described below illustrate operations of changing a configuration of buttons according to certain embodiments.

Figure 12A:
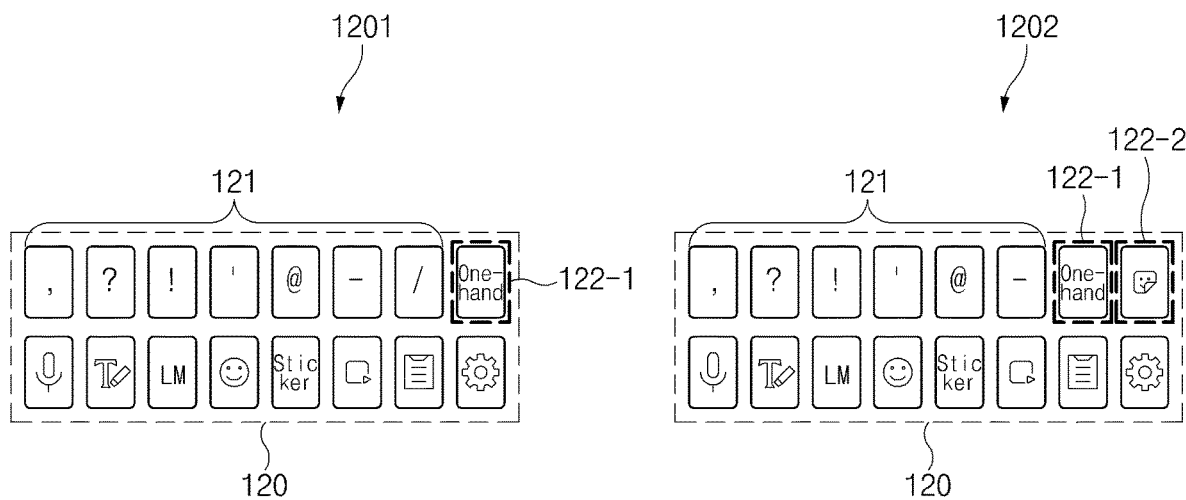
FIG. 12A is a drawing illustrating an operation of omitting a symbol button included in a UI, according to certain embodiments.

FIG. 12A is a drawing illustrating an operation of omitting a symbol button included in a UI 120, according to certain embodiments.

Referring to reference numeral 1201 of FIG. 12A, an electronic device 201 of FIG. 2 may display symbol buttons 121 and input buttons 122 for configuring the UI 120 in two rows. When the number of the input buttons 122 (e.g., 9 input buttons) is greater than a specified threshold (e.g., 8) by 1, the electronic device 201 may avoid changing the number of rows configuring the UI 120 and may omit one of the symbol buttons 121. The electronic device 201 may display the additional input button (e.g., an input button 122-1) which is greater than the threshold on a location of the omitted symbol button.

Referring to reference numeral 1202 of FIG. 12A, when the number of the input buttons 122 (e.g., 10 input buttons) is greater than the specified threshold (e.g., 8) by 2, the electronic device 201 may omit two of the symbol buttons 121. The electronic device 201 may display two input buttons (e.g., input buttons 122-1 and 122-2) which are greater than the threshold on locations of the omitted symbol buttons.

Figure 12B:
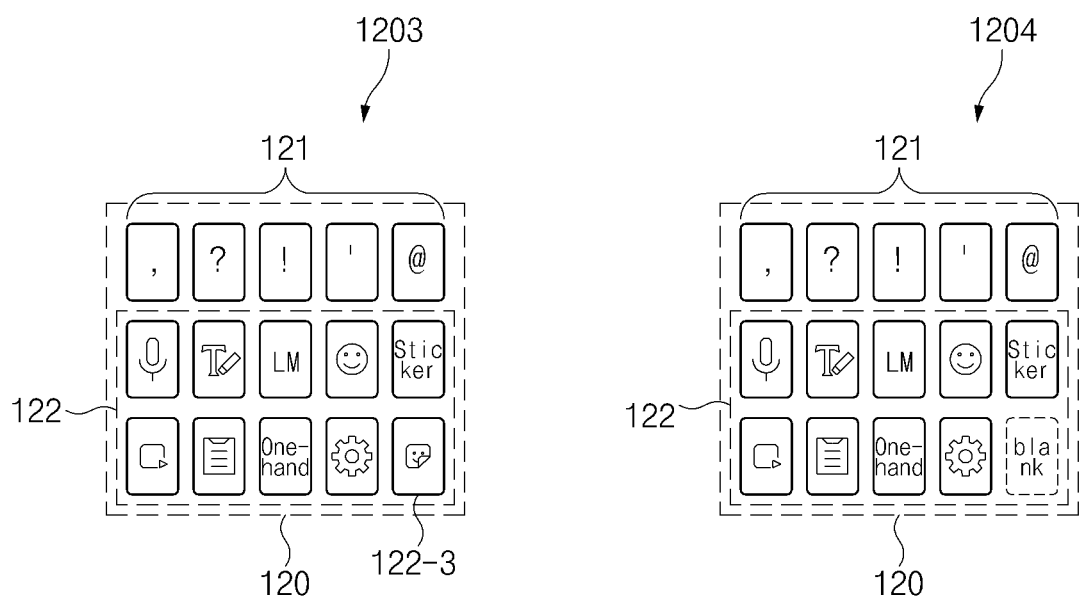
FIG. 12B is a drawing illustrating an operation of maintaining an array of buttons configuring a UI, according to certain embodiments.

FIG. 12B is a drawing illustrating an operation of maintaining an array of buttons configuring a UI 120, according to certain embodiments.

Referring to reference numeral 1203 of FIG. 12B, an electronic device 201 of FIG. 2 may display symbol buttons 121 and input buttons 122 for configuring the UI 120 in three rows. For example, each of rows configuring the UI 120 may include 5 buttons.

Referring to reference numeral 1204 of FIG. 12B, when the number of the input buttons 122 is 9, the electronic device 201 may fail to change the number of the rows configuring the UI 120 and may display the insufficient number of the input buttons 122 with a blank.

Figure 12C:
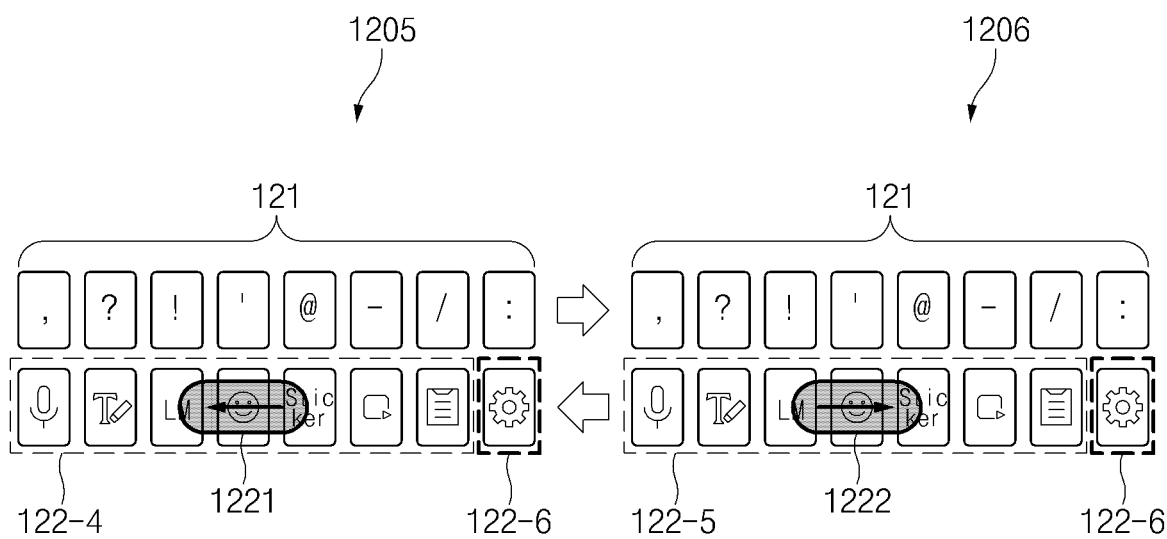
FIG. 12C is a drawing illustrating an operation of scrolling an input button included in a UI, according to certain embodiments.

FIG. 12C is a drawing illustrating an operation of scrolling an input button included in a UI 120, according to certain embodiments.

According to an embodiment, an electronic device 201 of FIG. 2 may display symbol buttons 121 and input buttons 122 configuring the UI 120. When receiving a user input for scrolling input buttons 122-4, the electronic device 201 may scroll the input buttons 122-4 in the scrolled direction. For example, referring to reference numeral 1205 of FIG. 12C, the electronic device 201 may scroll the input buttons 122-4 in the direction of reference numeral 1221 in response to a user input for scrolling the input buttons 122-4 in the direction of reference numeral 1221. For another example, referring to reference numeral 1206 of FIG. 12C, the electronic device 201 may scroll the input buttons 122-4 in the direction of reference numeral 1222 in response to a user input for scrolling the input buttons 122-4 in the direction of reference numeral 1222. According to an embodiment, the electronic device 201 may control an input button 122-6 for calling a setting function of a keyboard layout 110 not to be scrolled while the input buttons 122-4 are scrolled.

Figure 12D:
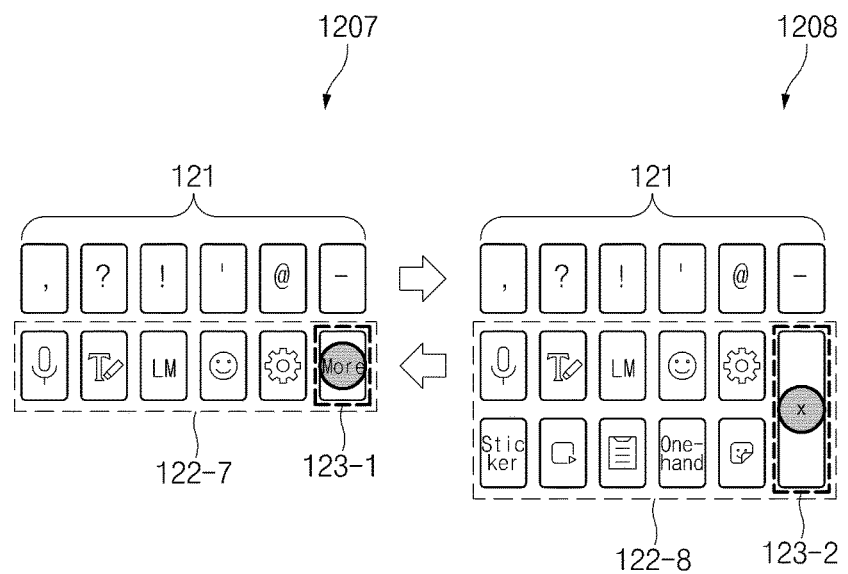
FIG. 12D is a drawing illustrating an operation of changing the number of input buttons included in a UI in response to a user input, according to certain embodiments.

FIG. 12D is a drawing illustrating an operation of changing the number of input buttons included in a UI 120 in response to a user input, according to certain embodiments.

Referring to reference number 1207 of FIG. 12D, an electronic device 201 of FIG. 2 may display symbol buttons 121 forming one row and input buttons 122-7 forming one row. The electronic device 201 may display an additional button 123-1 on a location where the input buttons 122-7 is displayed. For example, the additional button 123-1 may be displayed at the right of the input buttons 122-7. When receiving a user input for selecting the additional button 123-1, as shown in reference numeral 1208 of FIG. 12D, the electronic device 201 may display input buttons 122-6 forming two rows. The electronic device 201 may display a delete button 123-2 on a location where the input buttons 122-8 are displayed. For example, the delete button 123-2 may be displayed at the right of the input buttons 122-8. When receiving a user input for selecting the delete button 123-2, as shown in reference numeral 1207 of FIG. 12D, the electronic device 201 may display the input buttons 122-7 formed in one row.

As described above, an electronic device (e.g., an electronic device 201 of FIG. 2) may include a display (e.g., a display device 260 of FIG. 2), a memory (e.g., a memory 230 of FIG. 2) storing an application, and at least one processor (e.g., a processor 220 of FIG. 2). The at least one processor may be configured to execute the application, display a first screen of the application on the display in response to the execution of the application, display a second screen in response to a user input for selecting an input field or a text input button included in the first screen, display a keyboard layout and a UI including at least one input button associated with the keyboard layout within the second screen when a specified condition is met, and display the keyboard layout and an input button for calling the UI within the second screen when the specified condition is not met.

According to an embodiment, the at least one processor may be configured to display the keyboard layout and the UI within the second screen when the second screen includes a second UI including at least one input button associated with the application and display the keyboard layout and an input button for calling the UI within the second screen when the second screen does not include the second UI.

According to an embodiment, the at least one processor may be configured to display the UI within the second screen in response to a user input for selecting the input button for calling the UI.

According to an embodiment, the at least one processor may be configured to display the UI at an upper end in the keyboard layout or display the UI as a pop-up overlaid with the input button.

According to an embodiment, the at least one processor may be configured to overlay and display the UI on a region where the second UI is displayed.

According to an embodiment, the at least one processor may be configured to display the at least one input button in two rows when the number of the at least one input button included in the UI is greater than or equal to a specified threshold and display the at least one input button in three rows when the number of the at least one input button included in the UI is less than the threshold.

According to an embodiment, the at least one processor may be configured to display the at least one input button displayed in the two rows in the three rows in response to a user input for selecting an additional button included in the UI.

According to an embodiment, the at least one processor may be configured to display an input button for calling the UI within the keyboard layout.

As described above, a method of an electronic device (e.g., an electronic device 201 of FIG. 2) may include executing an application, displaying a first screen of the application in response to the execution of the application, and displaying a second screen in response to a user input for selecting an input field or a text input button included in the first screen. The displaying of the second screen may include displaying a keyboard layout and a UI including at least one input button associated with the keyboard layout within the second screen when a specified condition is met and displaying the keyboard layout and an input button for calling the UI within the second screen when the specified condition is not met.

According to an embodiment, the displaying of the second screen may include displaying the keyboard layout and the UI within the second screen when the second screen includes a second UI including at least one input button associated with the application and displaying the keyboard layout and an input button for calling the UI within the second screen when the second screen does not include the second UI.

According to an embodiment, the method may further include displaying the UI within the second screen in response to a user input for selecting the input button for calling the UI.

According to an embodiment, the displaying of the UI within the second screen may include displaying the UI at an upper end in the keyboard layout or displaying the UI as a pop-up overlaid with the input button.

According to an embodiment, the displaying of the UI within the second screen may include overlaying and displaying the UI on a region where the second UI is displayed.

According to an embodiment, the displaying of the UI within the second screen may include displaying the at least one input button in two rows when the number of the at least one input button included in the UI is greater than or equal to a specified threshold and displaying the at least one input button in three rows when the number of the at least one input button included in the UI is less than the threshold.

According to an embodiment, the method may further include displaying the at least one input button displayed in the two rows in the three rows in response to a user input for selecting an additional button included in the UI.

As described above, an electronic device (e.g., an electronic device 201 of FIG. 2) may include a display (e.g., a display device 260 of FIG. 2), a memory (e.g., a memory 230 of FIG. 2) storing an application, and at least one processor (e.g., a processor 220 of FIG. 2). The at least one processor may be configured to display a first screen of the application on the display in response to executing the application, display a second screen in response to a user input for selecting an input field or a text input button included in the first screen, display a keyboard layout and a UI including at least one input button associated with the keyboard layout within the second screen when a specified condition is met, and display the keyboard layout and an input button for calling the UI within the second screen when the specified condition is not met.

According to an embodiment, the at least one processor may be configured to display the keyboard layout and the UI within the second screen when the second screen includes a second UI including at least one input button associated with the application and display the keyboard layout and an input button for calling the UI within the second screen when the second screen does not include the second UI.

According to an embodiment, the at least one processor may be configured to overlay and display the UI on a region where the second UI is displayed.

According to an embodiment, the at least one processor may be configured to display the at least one input button in two rows when the number of the at least one input button included in the UI is greater than or equal to a specified threshold and display the at least one input button in three rows when the number of the at least one input button included in the UI is less than the threshold.

According to an embodiment, the at least one processor may be configured to display the at least one input button displayed in the two rows in the three rows in response to a user input for selecting an additional button included in the UI.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a display;
a memory storing an application; and
at least one processor, wherein the at least one processor is configured to:
execute the application;
display a first screen of the application on the display in response to the execution of the application; and
display a second screen in response to user input for selecting an input field or a text input button included in the first screen,
while displaying the second screen:
identify whether the second screen includes an application dedicated toolbar,
based on that the second screen does not include the application dedicated toolbar, display a keyboard layout and a user interface (UI) including at least one button associated with the keyboard layout within the second screen; and
based on that the second screen includes the application dedicated toolbar, display keyboard layout and alternate a specified button included in the keyboard layout to an input button for calling the UI within the second screen.

2. The electronic device of claim 1, wherein the at least one processor is further configured to display the UI within the second screen in response to a user input for selecting the input button.

3. The electronic device of claim 2, wherein the at least one processor is further configured to:
display the UI at an upper end in the keyboard layout; or
display the UI as a pop-up overlaid with the input button.

4. The electronic device of claim 2, wherein the at least one processor is further configured to overlay and display the UI on a region where the application dedicated toolbar is displayed.

5. The electronic device of claim 3, wherein the at least one processor is further configured to:
display at least one button included in the application dedicated toolbar in two rows, when the number of the at least one button included in the application dedicated toolbar is less than a specified threshold; and
display the at least one button included in the application dedicated toolbar in three rows, when the number of the at least one button included in the application dedicated toolbar is greater than or equal to the threshold.

6. The electronic device of claim 5, wherein the at least one processor is further configured to display the at least one button included in the application dedicated toolbar, displayed in the two rows, in the three rows in response to the user input for selecting an additional button included in the application dedicated toolbar.

7. A method of an electronic device, the method comprising:
executing an application;
displaying a first screen of the application in response to the execution of the application; and displaying a second screen in response to user input for selecting an input field or a text input button included in the first screen, while displaying the second screen:
- identifying whether the second screen includes an application dedicated toolbar,
- based on that the second screen does not include the application dedicated toolbar, displaying a keyboard layout and a user interface (UI) including at least one button associated with the keyboard layout within the second screen; and
- based on that the second screen includes the application dedicated toolbar, displaying the keyboard layout and alternating a specified included in the keyboard layout to an input button for calling the UI within the second screen.

8. The method of claim 7, further comprising:
displaying the UI within the second screen in response to a user input for selecting the input button.

9. The method of claim 8, wherein the displaying of the UI within the second screen comprises:
displaying the UI at an upper end in the keyboard layout; or
displaying the UI as a pop-up overlaid with the input button.

10. The method of claim 8, wherein the displaying of the UI within the second screen comprises:
overlaying and displaying the UI on a region where the application dedicated toolbar is displayed.

11. The method of claim 9, wherein the displaying of the UI within the second screen comprises:
- displaying at least one button included in the application dedicated toolbar in two rows, when the number of the at least one button included in the application dedicated toolbar is less than a specified threshold; and
- displaying the at least one button included in the application dedicated toolbar in three rows, when the number of the at least one button included in the application dedicated toolbar is greater than or equal to the threshold.

12. The method of claim 11, further comprising:
displaying the at least one button included in the application dedicated toolbar, displayed in the two rows, in the three rows in response to the user input for selecting an additional button included in the application dedicated toolbar.

* * * * *